United States Patent Office 3,723,365
Patented Mar. 27, 1973

3,723,365
ONE SHOT RIGID FOAMS FROM
SUCROSE POLYOLS
George Phillip Speranza and Philip Hotchkiss Moss,
Austin, Tex., assignors to Jefferson Chemical Company,
Inc., Houston, Tex.
No Drawing. Continuation-in-part of application Ser. No.
849,182, Aug. 11, 1969. This application Apr. 2, 1971,
Ser. No. 130,792
Int. Cl. C08g 22/44
U.S. Cl. 260—2.5 AS                    5 Claims

ABSTRACT OF THE DISCLOSURE

This invention is a new class of rigid polyurethane foams and a process for making these foams using a polyarylisocyanate and unique sucrose based polyols. The polyols are made by modifying conventional sucrose polyols. Conventional sucrose polyols are made by reacting sucrose with alkylene oxides containing 2 to 4 carbon atoms or mixtures thereof. These conventional sucrose polyols are reacted with higher molecular weight alkylene oxides to make the polyols of this invention. The resultant polyols enable rigid polyurethane foams to be made in one step (one shot) from polyarylisocyanates. Sucrose based rigid urethane foams are useful in many areas including insulation, decorative and structural paneling, flotation, and many other applications. Rigid urethane foams made from sucrose based polyols are especially desirable since they can easily be fire-retarded.

CROSS REFERENCE TO RELATED APPLICATION

This application is a continuation-in-part of co-pending parent application Ser. No. 849,182 filed Aug. 11, 1969, now abandoned.

BACKGROUND OF THE INVENTION

Field of the invention

This invention pertains to the field of sucrose based rigid polyurethane foams.

Description of the prior art

Sucrose polyether polyols prepared from the addition of ethylene oxide, propylene oxide and/or butylene oxide are well known. These conventional sucrose polyols may be prepared, for example, by the method described in Wismer's U.S. Pat. 3,085,085 (1963). Rigid urethane foams can be made from these polyols using toluene diisocyanate or products referred to as crude toluene diisocyanate. The foams may be made in one step by reacting all the ingredients together at once (one shot process) or, the foams may be made by a prepolymer process. The prepolymer process involves two steps. First the polyol and toluene diisocyanate must be reacted in a closed vessel to form what is known as a prepolymer, and then must be added to the remaining ingredients to achieve rigid foam. The prepolymer in some cases may contain a considerable amount of the original isocyanate in which case it is commonly referred to as a quasi-prepolymer.

In either the one shot or prepolymer process, the toxicity of the toluene diisocyanate or crude toluene diisocyanate is a hazard.

In recent years the trend has been to replace toluene diisocyanate with the less volatile and less toxic polyaryl isocyanates represented by the formula below and structural isomers thereof:

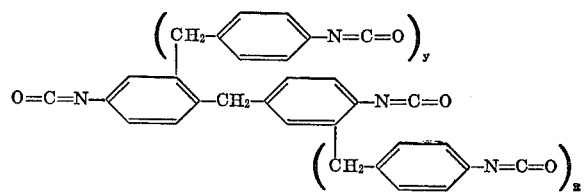

$x+y=0$ to about 2

These polyarylisocyanates are much less toxic than toluene diisocyanate and are, therefore, generally preferred for the making of rigid foams. However, if one takes a regular lower alkylene oxide adduct of sucrose and tries to make a one shot foam using a polyarylisocyanate, the results are disappointing. The foams either collapse or are of poor quality.

The improvement of this invention is adding at least one mol of high molecular weight alkylene oxide to conventional lower alkylene oxide adducts of sucrose which allows excellent foams to be made using the one shot process.

Anderson's U.S. Pat. 2,902,478 (1959), Bressler's U.S. Pat. 2,990,376 (1961), Wismer's U.S. Pat. 3,153,002 (1964), and Wismer's U.S. Pat. 3,222,257 (1965) describe propylene and/or ethylene/propylene oxide adducts of sucrose as intermediates in rigid urethane foam. All of these references, however, teach only the use of sucrose polyols with toluene diisocyanate. My improvement described herein enables foams to be made from sucrose polyols using polyarylisocyanates in a one shot process.

Crecelius' U.S. Pat. 3,018,281 (1962) describes sucrose adducts similar to those of this invention for use as surface-active agents. No mention is made of the use of these products in the completely unrelated field of rigid polyurethanes.

SUMMARY OF THE INVENTION

The invention is a new class of sucrose-based rigid polyurethane foams and a process for making these foams using, among other ingredients, a polyarylisocyanate and the sucrose based polyols of this invention. The polyols are made by modifying conventional sucrose polyols. Conventional sucrose polyols are made by reacting sucrose with three or less mols of alkylene oxides containing 2 to 4 carbon atoms or mixtures thereof per sucrose hydroxyl group. The conventional sucrose polyds are reacted with higher mlecular weight alkylene oxides containing 8 to 21 carbon atoms of mixtures thereof to make the polyols of this invention. Sucrose polyols containing this high mlecular weight alkylene oxide enable rigid polyurethane foams to be made easily in a one shot process with polyarylisocyanates. One shot rigid urethane foams made from conventional sucrose polyols and polyarylisocyanates are very difficult to process and are of poor quality.

DESCRIPTION OF THE PREFERRED
EMBODIMENTS

Rigid polyurethane foams are well known. They may be made by reacting a wide variety of polyols and organic isocyanates together with other ingredients as needed including catalysts, silicone stabilizers, water, auxiliary blowing agents and fire retardants.

Many rigid urethane foams are made using toluene diisocyanate. Conventional sucrose polyols made by reacting lower alkylene oxides with sucrose can be made into foam using toluene diisocyanate.

Due to the high toxicity of toluene diisocyanate and the fact that rigid foams made using polyarylisocyanates are superior to foams made using toluene diisocyanate in the areas of dimensional stability, heat distortion, and ease of fire retardency, the trend in recent years is to make rigid urethane foams using polyarylisocyanates represented by the formula below and structural isomers thereof:

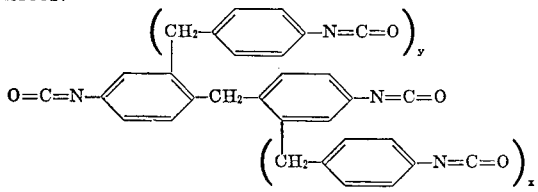

$x+y=0$ to about 2

These polyarylisocyanates are made by phosgenating the reaction product of aniline and formaldehyde as described, for example, in Seeger's U.S. Pat. 2,683,730 (1954). In the foams of my invention, the preferred range of $x+y$ in the above formula is 0.2 to 1.5.

Conventional sucrose polyols are made by reacting sucrose with three or less mols of lower alkylene oxides or combinations of lower alkylene oxides per sucrose hydroxyl group as described, for example, in U.S. Pat. 3,085,085. These lower alkylene oxides usually contain from 2 to 4 carbon atoms. We have found that if one takes a typical sucrose polyol containing from about 7 to 14 propylene oxide or propylene oxide/ethylene oxide groups and tries to make a one shot rigid foam using a polyarylisocyanate, the results are very disappointing. Using the 7 to 9 mol adducts, the foams collapse. Using the 10 to 14 mol adducts, the foams are coarse and have a closed cell content of about 85% when over 90% is desired.

reacting a conventional sucrose polyol with at least one mole of a higher molecular weight alkylene oxide containing 8 to 21 carbon atoms or mixtures thereof.

Examples of such high molecular weight alkylene oxides useful in our invention include those of the formula:

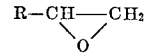

where R is a straight or branch chained alkyl of 6 to 19 carbon atoms. Alkylene oxides with an internal epoxide group, as opposed to the alpha epoxides of the above formula, are also useful in our invention but the alpha olefin epoxides are preferred because of their greater reactivity. Typical examples of olefin epoxides useful in our invention include octene-1 epoxide, decene-2 epoxide, decene-1 epoxide, undecene-1 epoxide, dodecene-1 epoxide, dodecene-2 epoxide, tetradecene-1 epoxide, pentadecene-1 epoxide, hexadecene-1 epoxide, heptadecene-1 epoxide, octadecene-2 epoxide, nonadecene-1 epoxide, eicosene-1 epoxide, and the various branched isomers of the above compounds.

Other high molecular weight alkylene oxides useful in our invention include phenoxyglycidol ethers of the formula:

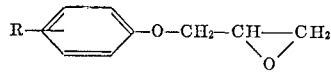

where R is H or an alkyl group containing one to twelve carbon atoms. Typical examples of phenoxyglycidol ethers useful in our invention include phenoxyglycidol ether, methylphenoxy glycidol ether, ethylphenoxyglycidol ether, propylphenoxyglycidol ether, butylphenoxyglycidol ethers, pentylphenoxyglycidol ether, hexylphenoxyglycidol ether, heptylphenoxy glycidol ether, octylphenoxyglycidol ether, nonylphenoxyglycidol ether, decylphenoxyglycidol ether, undecylphenoxyglycidol ether, and dodecylphenoxyglycidol ether.

The resulting polyol has the following formula:

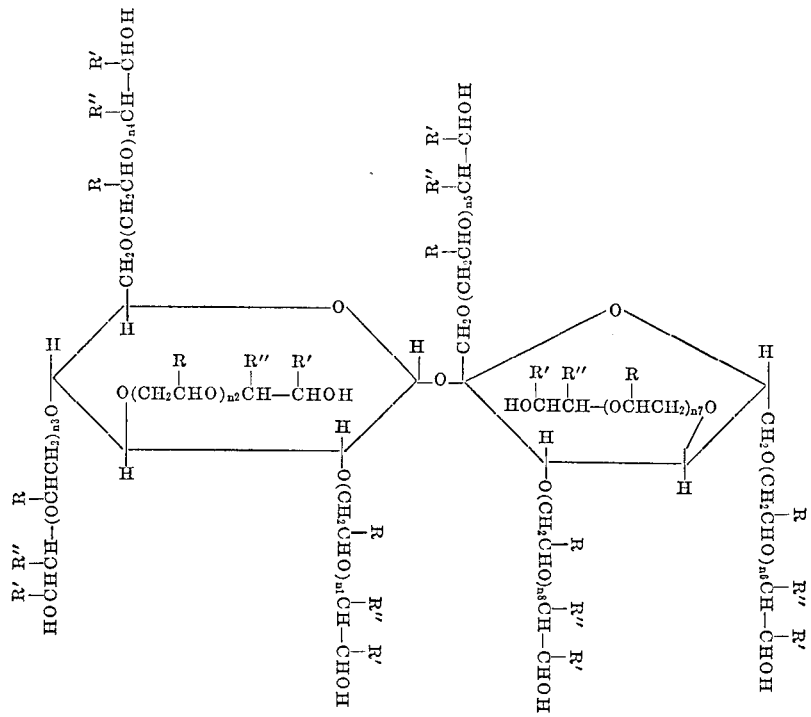

This invention is a new class of sucrose based rigid polyurethane foams and a process for making these foams using among other ingredients, as needed, a polyarylisocyanate and a new sucrose based polyol. This polyol, which enables one shot foams from polyarylisocyanates to be made successfully using sucrose polyols, is made by wherein $n_1$, $n_2$, $n_3$, $n_4$, $n_5$, $n_6$, $n_7$ and $n_8$ are 0 or 1 and their sum being in the range from 0 to 8, R or R' is H, $CH_3$, or $C_2H_5$, and when R'' is H, at least one R' contains from 6 to 19 carbon atoms, a phenoxy methyl group, or an alkyl phenoxy methyl group wherein the alkyl group contains from 1-12 carbon atoms; and at least one R" contains from 5–18 carbon atoms when R' contains at least one carbon atom, provided the sum of R' and R" does not exceed 19 carbon atoms.

To achieve acceptable foam physical properties and allow the foams to be more easily fire retarded, it is preferred to use a conventional sucrose polyol containing not more than two mols of lower alkylene oxide per sucrose hydroxyl group.

Another advantage of the polyols of this invention is the reduction in viscosity over conventional sucrose polyols. The lower viscosity greatly facilitates pumping and handling during foam manufacture.

The catalysts which may be used to make the foams of my invention are well known. There are two general types of catalysts, tertiary amines and organo-metallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexylhexahydroaniline, piperazine, N-ethylmorpholine, 2-methylpiperazine, dimethylaniline, nicotine, dimethylaminoethanol, tetramethylpropanediamine, and methyltriethylenediamine. Useful organo-metallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, tributyltin, dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organo-metallic compound are often used together in the polyurethane reaction.

Often useful in the foams of my invention are silicone stabilizers usually silicone-glycol copolymers such as, for example, those prepared in accordance with the disclosure of Bailey's U.S. Pat. 2,834,748 (1958). Such materials have the formula:

$$R'Si[O—(R_2SiO)_n—(oxyalkylene)_mR"]_3$$

wherein R, R' and R" are alkyl groups containing 1–4 carbon atoms, $n$ is 4–8, $m$ is 20–40, and the oxyalkylene groups are derived from ethylene and propylene oxides or mixtures thereof.

Examples of blowing agents used to prepare urethane foams are described in Frost's U.S. Pat. 3,072,582 (1963). Blowing agents are usually volatile liquids such as fluorocarbons.

Fire retardants that can be incorporated in the foaming mixture are of two types—those that are incorporated by mere mechanical mixing and those that become chemically bound in the polymer chain. The most commonly used of the first type are tris(chloroethyl) phosphate, tris(2,3-dibromopropyl) phosphate, diammonium phosphate, various halogenated compounds and antimony oxide. The second type fire retardant probably offers the best approach to the problem of fire retarding foams. Examples of this type fire retardant include chlorendic acid derivatives and various phosphorus-containing polyols.

The following examples will illustrate the improvement of my invention over the prior art.

Example 1 is illustrative of an unsuccessful attempt to use a prior art sucrose polyol (propylene oxide/ethylene oxide adduct of sucrose) in a one shot rigid urethane foam using a polyarylisocyanate.

The polyol used to prepare the successful foam of Example 2 is illustrative of my invention. The polyol of Example 1 is modified with the addition of one mol of a higher molecular weight alkylene oxide.

Example 3 demonstrates the use of the polyol of Example 2 in a fire retarded formulation.

Example 4 is an unsuccessful attempt to make a rigid foam from a prior art sucrose polyol (propylene oxide adduct of sucrose) using a polyarylisocyanate.

Example 5 is a successful foam made using a polyarylisocyanate and a polyol of my invention made from sucrose, propylene oxide and a high molecular weight alkylene oxide.

EXAMPLE 1

Propylene oxide (6.5 mols per mol of sucrose) was added to sucrose using potassium hydroxide as catalyst. Then 3.0 mols of ethylene oxide was added and the product polyol neutralized and filtered. The product polyol had a hydroxyl number of 581 and a viscosity at 25° C. of 272,000 cps. An attempt was made to use this product in a standard one shot rigid formulation as given below. The foam rose to about half its normal height and collapsed.

Formulation: P.b.w.
- Polyol of example _____ 34.3
- Silicone fluid (SF–1109) _____ 0.5
- Dimethylaminoethanol _____ 0.6
- Tetramethylpropanediamine _____ 0.4
- Trichlorofluoromethane _____ 14.0
- Polyarylisocyanate (Mondur MR) _____ 50.2

EXAMPLE 2

One mol of Nedox 1114 was added to one mol of the propylene oxide/ethylene oxide adduct of sucrose described in Example 1. Nedox 1114 has the formula:

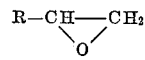

where R=$C_9$–$C_{12}$ straight chain alkyl. The resulting polyol had a viscosity at 25° C. of 178,000 cps. When the polyol was used in the following formulation, an excellent foam resulted.

Formulation: P.b.w.
- Polyol of this example _____ 38.7
- SF–1109 _____ 0.5
- Dimethylaminoethanol _____ 0.6
- Tetramethylpropanediamine _____ 0.4
- Trichlorofluoromethane _____ 14.0
- Polyarylisocyanate (Mondur MR) _____ 45.8

Foam properties:
- Cream time, sec. _____ 22.0
- Tack-free time, sec. _____ 60.0
- Density, pounds/cubic foot _____ 2.06
- Percent closed cells _____ 93.0
- Heat distortion temp., ° C. _____ 212
- After 1 week, 158° F., 100% relative humidity, ΔV, ΔW, ΔL, percent _____ 9, –6, 6
- –20° F., dry, 1 week ΔV, ΔW, ΔL ____ –1, 0, –1
- Burn distance, ASTM 1692, inches _____ 8

EXAMPLE 3

To the formulation of Example 2 was added a commercially available fire retardant containing phosphorous.

The results indicate the excellent increase in fire retardancy over the foam of Example 2.

Formulation: P.b.w.
- Polyol of this example _____ 31.4
- SF-1109 _____ 0.5
- Dimethylaminoethanol _____ 0.3
- Tetramethylpropanediamine _____ 0.2
- Fluorocarbon 11b _____ 13.0
- Fyrol 6 [1] _____ 8.0
- Mondur MR _____ 46.6

Foam properties:
- Cream time, sec. _____ 25.0
- Tack-free time, sec. _____ 110.0
- Density, pounds/cubic foot _____ 2.03
- Percent closed cells _____ 94.0
- Heat distortion temp., °C. _____ 185
- After 1 week, 158° F., 100% relative humidity, $\Delta V, \Delta W, \Delta L$, percent _____ 10, −3, 6
- −20° F., dry, 1 week $\Delta V, \Delta W, \Delta L$ ____ −1, 0, −1
- Burn distance, ASTM 1692, inches _____ 1.2

[1] 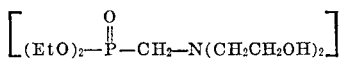

EXAMPLE 4

Ten mols of propylene oxide were allowed to react with one mol of sucrose in the presence of potassium hydroxide catalyst. The product was neutralized with oxalic acid dihydrate, filtered after stripping to 110° at 5 mm. pressure. The product had a hydroxyl number of 556 and a viscosity at 25° C. of 273,000 cps.; 355 g. of this product was mixed with 6 g. of SF-1109 silicone oil, 6 g. of dimethylaminoethanol, 2 g. of methyltriethylenediamine, and 140 g. of blowing agent—trichlorofluoromethane. This mixture was homogeneous, stable and had a viscosity of 6,200 centipoises at 25° C. It showed very poor compatibility with polyarylisocyanate. When 305.4 g. of this component was mixed with 294.6 g. of polyarylisocyanate at 88° C. (to increase compatibility of the polyol and polyisocyanate) a mottled foam rose about half the expected height and collapsed.

EXAMPLE 5

To a one-liter, 3-necked flask was added 565 g. of a sucrose 9 mol propylene oxide adduct, one gram of potassium hydroxide and one gram of water. Then 184 g. of Nedox 1114 was added and the reaction mixture heated at about 180° C. for seven hours. The reaction mixture was cooled to 115° C. and one gram of oxalic acid added. The reaction product was stripped at 115° C. and about 5 mm. There was 40 g. collected overhead. The reaction product had a hydroxyl number of 450 and a viscosity at 25° C. of 46,500 cps. An excellent "one-shot" rigid foam was made from this product using polyarylisocyanate in the following formulation:

Formulation: P.b.w.
- Polyol of this example _____ 39.8
- Silicone—SF-1109 _____ 0.5
- Dimethylaminoethanol _____ 0.6
- Tetramethylpropanediamine _____ 0.4
- Fluorocarbon 11b _____ 14.0
- Polyarylisocyanate (Mondur MR) _____ 44.7

Foam properties:
- Cream time, sec. _____ 30
- Tack-free time, sec. _____ 150
- Density, p.c.f. _____ 2.0
- Heat distortion, °C. _____ 176
- Percent closed cells _____ 91
- Tensile, p.s.i. _____ 26
- 158° F., 100% relative humidity, 1 week $\Delta V, \Delta W, \Delta L$ _____ +8, −2, +6
- 180° F., Percent relative humidity, 1 week $\Delta V, \Delta W, \Delta L$ _____ +5, −4, +4
- −20°, 0% relative humidity, 1 week $\Delta V, \Delta W, \Delta L$ _____ −3, 0, −3

Sucrose based rigid urethane foams are useful in many areas including insulation, decorative and structural paneling, flotation, and many other applications. Rigid urethane foams made from sucrose based polyols are especially desirable since they can easily be fire-retarded.

What is claimed is:

1. A rigid urethane foam obtained by reacting a polyarylisocyanate with a polyol in the presence of a blowing agent in a one shot process wherein the polyol is the reaction product of (a) sucrose polyol containing from 7 to 14 mols of a lower alkylene oxide containing 2 to 4 carbon atoms or mixtures thereof and (b) at least one mol of a higher molecular weight alkylene oxide having 8 to 21 carbon atoms or mixtures thereof, or phenoxyglycidol ethers of the formula

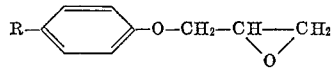

wherein R is H or an alkyl group containing 1 to 12 carbon atoms.

2. The rigid urethane foam of claim 1 wherein the said reaction product is made by reacting sucrose with a lower alkylene oxide containing 2 to 4 carbon atoms or mixtures thereof and reacting the resulting intermediate with at least one mol of a higher molecular weight alkylene oxide containing 8 to 21 carbon atoms or mixtures thereof.

3. The rigid urethane foam of claim 2 wherein the higher molecular weight alkylene oxide has from 11 to 14 carbon atoms or mixtures thereof.

4. The rigid urethane foam of claim 2 wherein the lower alkylene oxide is propylene oxide.

5. The rigid urethane foam of claim 2 wherein the lower alkylene oxide is a mixture of propylene oxide and ethylene oxide.

References Cited
UNITED STATES PATENTS 3,085,085    4/1963    Wismer et al. _____ 260—209
3,153,002    10/1964    Wismer et al. _____ 260—2.5

DONALD E. CZAJA, Primary Examiner

M. I. MARQUIS, Assistant Examiner

U.S. Cl. X.R.

260—2.5 AP, 18 TN, 45.7 P, 45.75 R, 77.5 AS